March 31, 1925. 1,531,370
F. G. BEAVERS
CURRENT GENERATING PLANT
Filed March 17, 1923  2 Sheets-Sheet 1
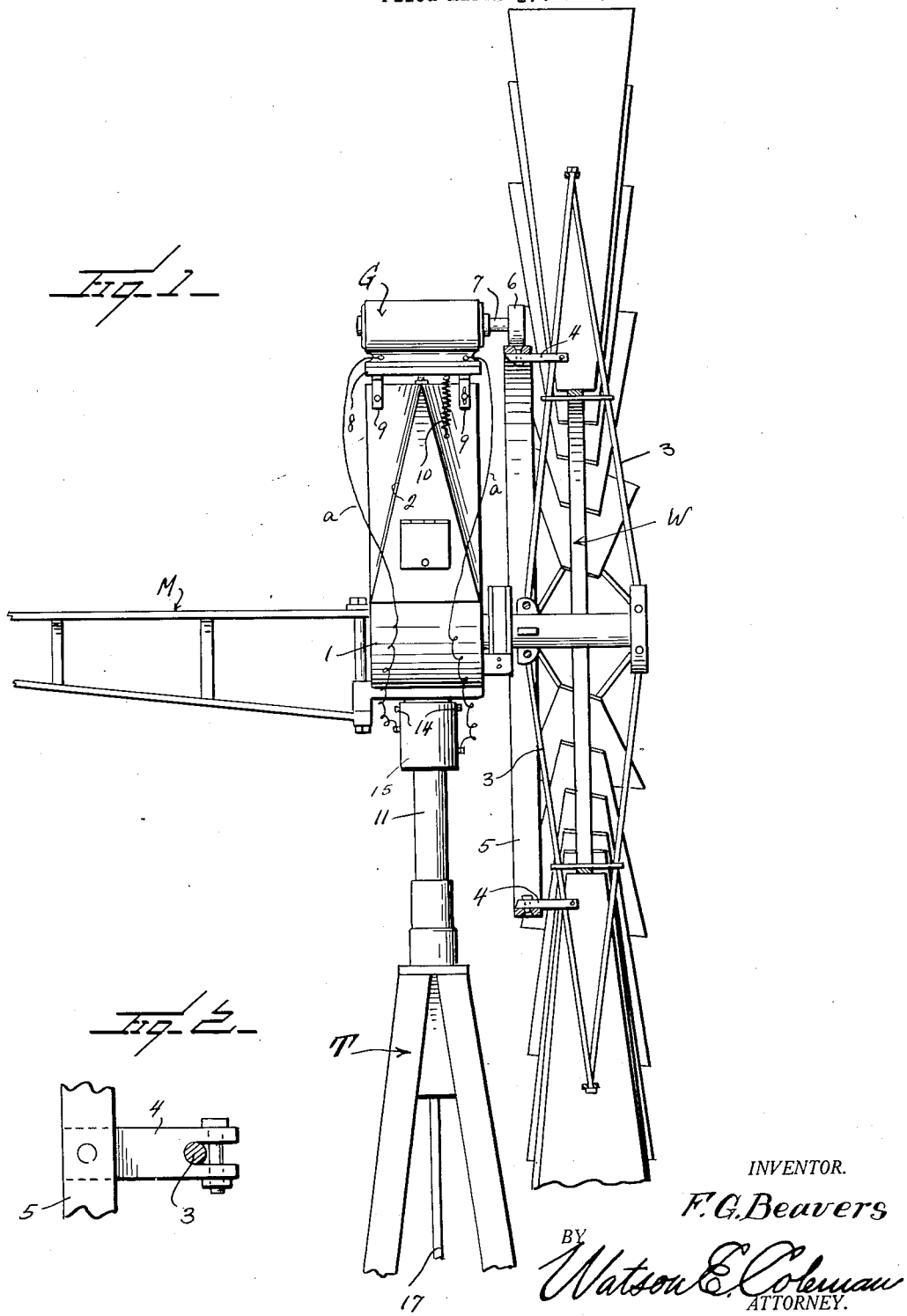

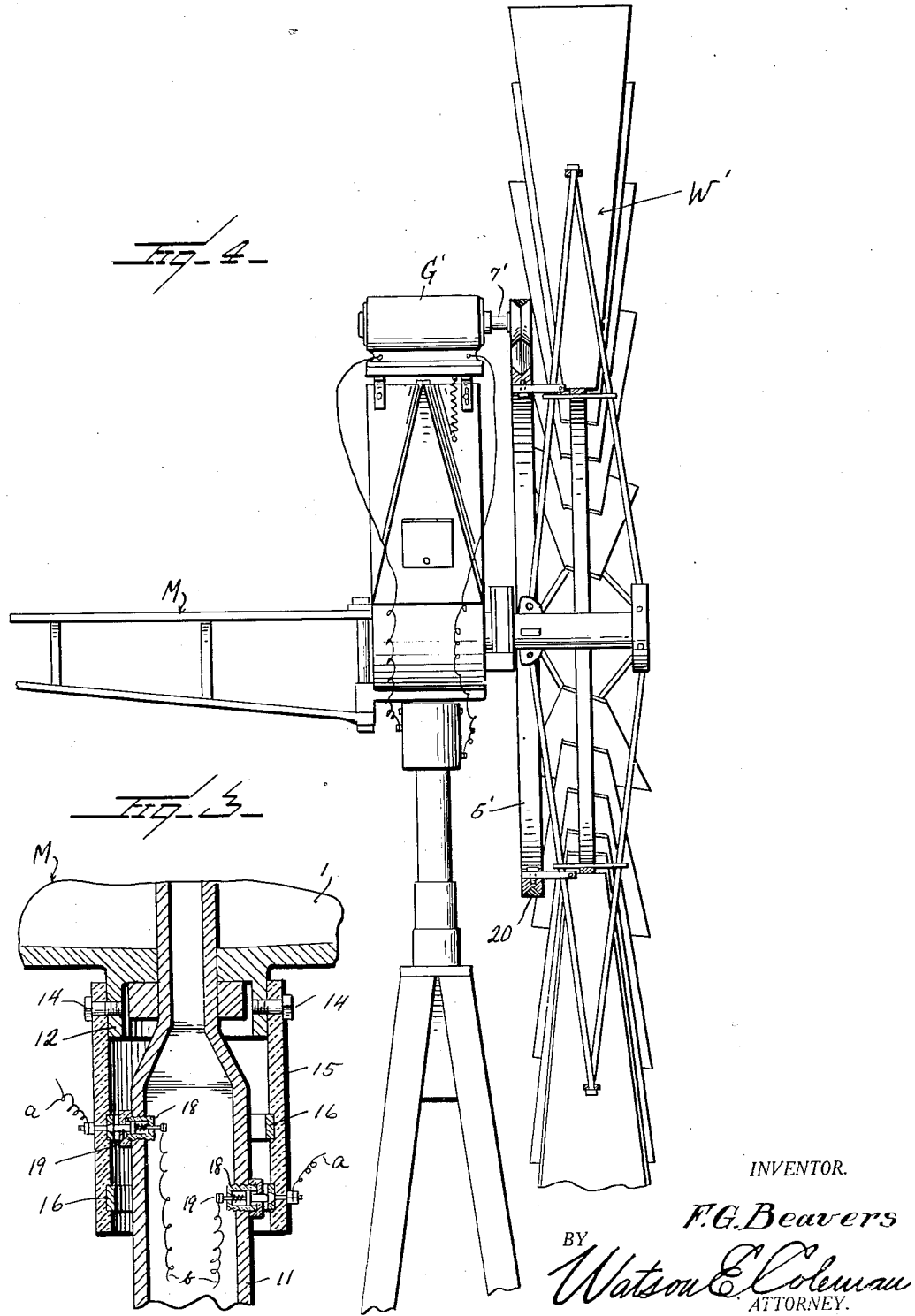

Patented Mar. 31, 1925.

1,531,370

UNITED STATES PATENT OFFICE.

FABIAN G. BEAVERS, OF AMERICUS, GEORGIA.

CURRENT-GENERATING PLANT.

Application filed March 17, 1923. Serial No. 625,698.

*To all whom it may concern:*

Be it known that I, FABIAN G. BEAVERS, a citizen of the United States, residing at Americus, in the county of Sumter and State of Georgia, have invented certain new and useful Improvements in Current-Generating Plants, of which the following is a specification, reference being had to the accompanying drawings.

This invention relates to current generating plants and has relation more particularly to a plant of this general character wherein the generator is driven from the wheel of a windmill and it is an object of the invention to provide a plant of this general character having novel and improved means wherein the generator is in direct driven connection with the wheel.

Another object of the invention is to provide a novel and improved plant of this general character wherein the generator is supported by the mill and arranged at a point to effect a direct driving connection for the generator with the wheel.

An additional object of the invention is to provide a plant of this general character wherein the mill embodies a tank for the gears and with which tank is associated a helmet or hood, the generator being supported directly by the helmet or hood and in driven connection with the wheel.

The invention consists in the details of construction and in the combination and arrangement of the several parts of my improved current generating plant whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a fragmentary view partly in elevation and partly in section illustrating a current generating plant constructed in accordance with an embodiment of my invention;

Figure 2 is a fragmentary sectional view illustrating in detail a mounting for the driving element;

Figure 3 is an enlarged fragmentary sectional view illustrating the means herein embodied for transporting the current generated; and Figure 4 is a view partly in elevation and partly in section illustrating a further embodiment of my invention.

As disclosed in the accompanying drawings, M denotes a mill of a type employed for pumping and which embodies the wind wheel W and an oil tank 1 in which run the gears (not shown) operated from the shaft of the wheel W. Positioned upon the tank 1 is a hood or helmet 2 which serves to cover the working parts of the mill to prevent ingress of rain within the tank 1, to prevent oil from splashing out and to keep out dust.

The wheel W, as herein disclosed, includes in its construction the rods or spokes 3. Clamped or otherwise secured to the inner rods or spokes 3 are the outstanding arms or brackets 4 having affixed to their outer portions an annular drive member 5 of suitable material and which member 5 has direct frictional contact with the disc or wheel 6 carried by the armature shaft 7 of the generator G.

The generator G is mounted upon the table 8 herein disclosed as positioned above the hood or helmet 2 through the instrumentality of the brackets 9. The table 8 is supported by the brackets 9 for movement, preferably swinging, relative to the hood or helmet 2 and said table 8 is constantly urged in one direction through the instrumentality of the spring 10. By this arrangement it is assured that the disc 6 and the wheel 5 will be maintained in proper frictional contact so that when the wheel W revolves, the shaft 7 will rotate at a speed to generate the desired current.

The mill M is mounted in a conventional manner upon the upstanding posts 11 carried by the tower T. The mill is provided with a depending annular flange 12 surrounding the posts 11 and in relatively close proximity thereto.

Bolted as at 14 or otherwise secured to the flange 12 is the upper portion of a depending sleeve 15 of suitable insulating material. The inner surface of the sleeve 15 at points spaced longitudinally thereof is provided with the annular contact rings 16 which are in suitable electrical connection through the conductors *a* with the generator G.

The post 11 is hollow with the passage therethrough of the pump rod generally indicated at 17 and which rod is operated in any desired manner by the mill M. Disposed through the wall of the post 11 at predetermined points thereon are the bushings 18 of insulating material and which carry the spring pressed contact members 19 which have electrical engagement with the contact rings 16. Leading from the contact members 19 are the conductors $b$ through which the current from the generator G is conveyed or transported as desired and preferably to a storage battery. By the arrangement hereinbefore described a windmill of a type now generally employed for pumping or otherwise may also be readily and conveniently employed for the generating of current.

In the embodiment of my invention as illustrated in Figure 4 the wheel 5′ is also directly carried by the wind wheel W′ and said wheel 5′ is in driving connection with the armature shaft 7′ of the generator G′ through the medium of the endless belt 20.

From the foregoing description it is thought to be obvious that a current generating plant constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In a windmill, the combination with its wheel working parts driven by the wheel, an oil tank for such parts, and a protecting hood mounted upon the oil tank, a generator mounted upon the hood, and a driving means for the generator carried directly by the wheel.

2. In a windmill, the combination with its wheel working parts driven by the wheel, an oil tank for such parts, and a protecting hood mounted upon the oil tank, a table positioned above the hood, means for supporting the table on the hood for swinging movement, a generator mounted on the table, and means for driving the generator directly from the wheel.

3. In a windmill, the combination with its wheel working parts driven by the wheel, an oil tank for such parts, and a protecting hood mounted upon the oil tank, a table positioned above the hood, means for supporting the table on the hood for swinging movement, a generator mounted on the table, means for driving the generator directly from the wheel, and means for automatically imparting swinging movement to the table in one direction.

In testimony whereof I hereunto affix my signature.

FABIAN G. BEAVERS.